(No Model.) 3 Sheets—Sheet 1.
H. O. THOMAS.
TREE BALER.
No. 494,353. Patented Mar. 28, 1893.
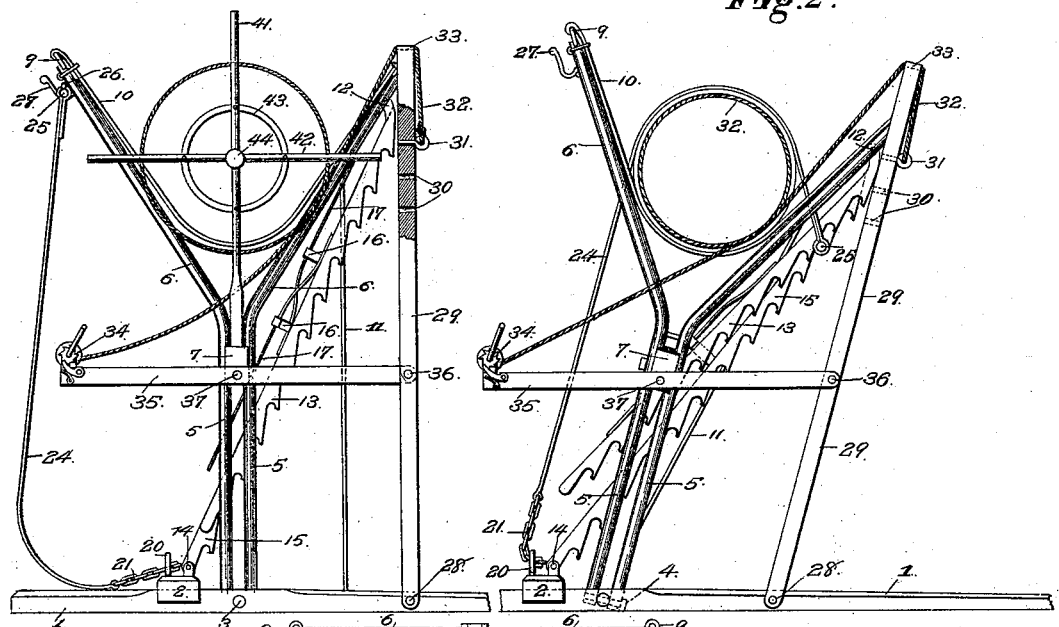
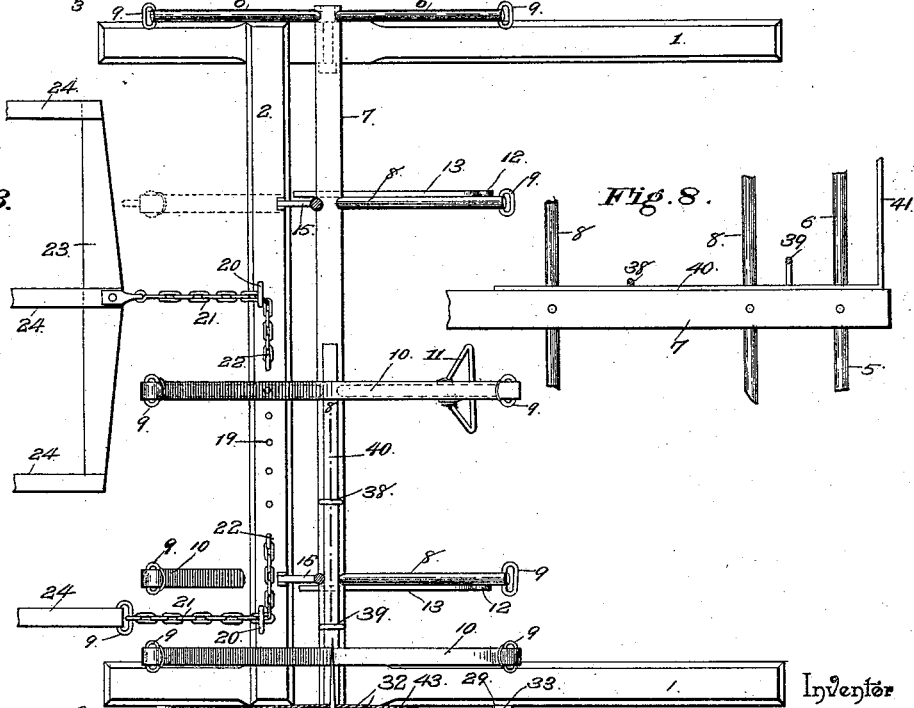
Witnesses  
M. Fowler  
John M. Biggers
Inventor  
Henry O. Thomas  
By his Attorneys,  
C. A. Snow & Co.

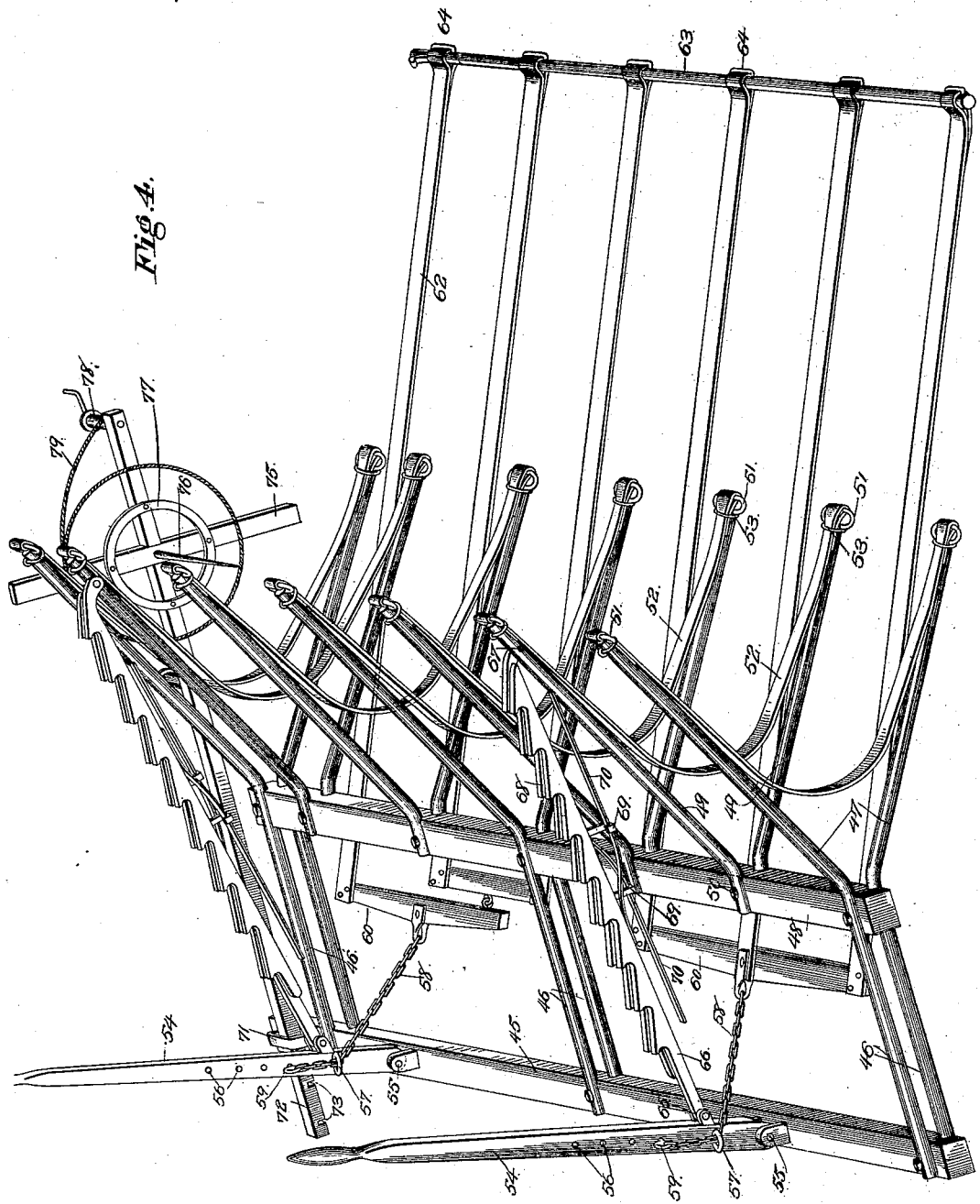

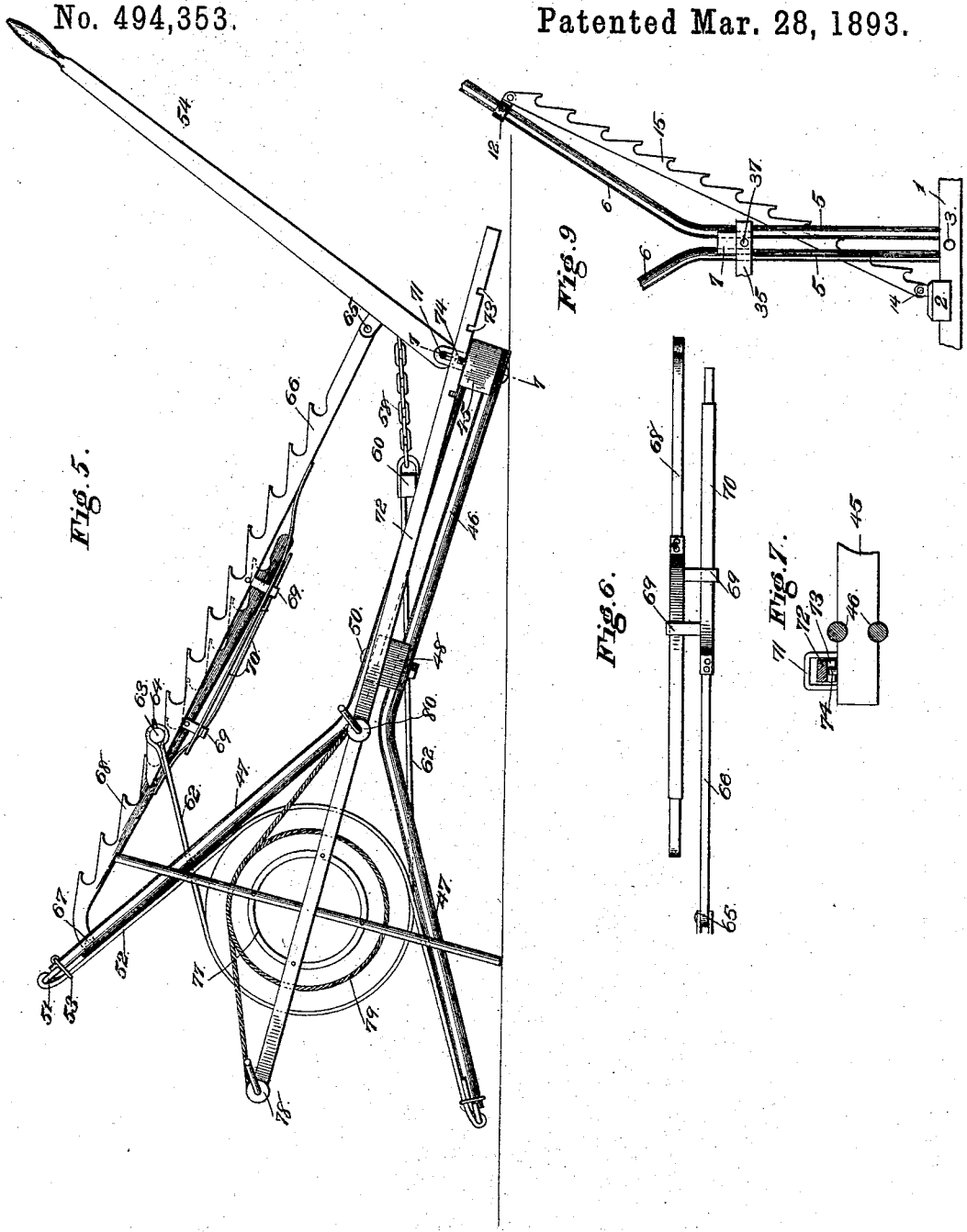

UNITED STATES PATENT OFFICE.

HENRY O. THOMAS, OF KIMBALL, ASSIGNOR OF ONE-HALF TO JOHN W. STEVENSON, OF NORTH BEND, NEBRASKA.

TREE-BALER.

SPECIFICATION forming part of Letters Patent No. 494,353, dated March 28, 1893.

Application filed June 2, 1892. Serial No. 435,305. (No model.)

*To all whom it may concern:*

Be it known that I, HENRY O. THOMAS, a citizen of the United States, residing at Kimball, in the county of Kimball and State of Nebraska, have invented a new and useful Tree-Baler, of which the following is a specification.

My invention relates to improvements in machines for baling or bundling trees, saplings, shrubs, &c., and has particular reference to certain improvements upon constructions shown, described and claimed by me in my application for patent, filed April 1, 1892, and bearing Serial No. 427,391.

The main objects of my present invention are to produce a cheap and simple machine capable of efficiently and easily bundling or baling trees, saplings, or shrubs; to avoid during said bundling injury to the bark by the sliding movement of the baling straps, to provide means for increasing or decreasing the capacity of the machine, whereby it is adapted for operating upon large and small quantities of trees, shrubs, or saplings to provide an automatic take-up or tightener; and to provide an efficient means for gathering and flaring the ends of the straw or other baling material which surrounds the bale or bundle whereby the same may be tied and the tie prevented from slipping off; a further object is to provide for an automatic prop or support for the cradle, whereby the same is held in a proper position for the introduction of the trees, saplings or shrubs.

With these objects in view, the invention consists in certain features of construction hereinafter specified and particularly pointed out in the claims.

Referring to the drawings:—Figure 1 is an end elevation of a baling machine embodying my improvements and illustrating my preferred form of construction. Fig. 2 is a similar view of the same machine the same being in the act of baling. Fig. 3 is a plan view of the machine, the same being in position to receive the trees, saplings, or shrubs. Fig. 4 is a perspective view of the modified construction of machine, the same being in position to receive the trees, and the machine being specially adapted for baling or bundling the large trees or saplings. Fig. 5 is a similar view, the machine being shown in the position of baling. Fig. 6 is a detail in plan of the automatic take-up. Fig. 7 is a transverse section on line 7—7 of Fig. 5. Fig. 8 is a longitudinal section on the line 8—8 of Fig. 3. Fig. 9 is a detail in elevation of the bale strap locking device, the same being shown in modified form.

Like numerals of reference indicate like parts in all the figures of the drawings.

1 designates a pair of opposite sills, which are connected by a transverse sill 2. Short transverse shafts 3 pass through the sills in advance of the sill 2 and through the outer ends of the shafts 3 bolts 4 are passed. These bolts pass through the lower ends of a pair of standards 5, such standards being located therefor at opposite sides of the base of the machine. The standards are parallel to each other for a portion of their length after which they diverge each pair combining to form a Y-shaped support 6. At their points of bending the standards are connected by a transverse bar 7, the opposite sides of which are embraced by the standards of each pair which latter are bolted securely to the bar. Between the opposite pairs of standards there rise from the bar 7 pairs of diverging Y-shaped supports 8, and these supports combine with the supports 6 to form what I term the cradle of the machine. Each of the supports 6 and 8 terminates at its upper end in an eye 6, and the eyes of each pair of opposite supports are connected by supporting straps 10, which also form a part of the cradle. It will thus be seen that the cradle as constructed is capable of swinging upon the base, all for a purpose hereinafter specified.

To one of the intermediate supports 8 at a suitable point thereon there is loosely connected the upper end of a swinging leg 11, which, when the cradle is raised swings by gravity to a supporting position, and as will hereinafter be apparent, when the cradle is lowered, will be swung automatically out of its supporting position and to a position that will not obstruct the free movement of the cradle.

Clips 12, are secured rigidly near the upper ends of two or more of the supporting arms 8, and it may be the end supporting arms 6 of the cradle, and at that side of the cradle which I term the front, it being farthest away from the cross-sill 2, and pivoted at their upper ends to these clips, or they may be otherwise connected to the arms, is a pair of toothed rack-bars 13, the teeth being inclined downward. In bearings 14 upon the cross-sill 2 there is pivoted a pair of similar rack-bars 15, similarly toothed as the rack-bars 13, and arranged alongside the same so that the rack-bars of each pair are adapted to slide by each other. These rack-bars as will hereinafter appear constitute an automatic take-up for the baling straps of the machine. Each rack-bar has secured and depending therefrom a clip 16, and is further provided upon its under side with a spring tongue 17, the free end of the spring-tongue of one rack-bar resting in the clip of the opposite rack-bar.

In the sill 2 near the opposite ends thereof, or at other suitable points, opposite series of holes 19, are located and at the outer ends of the series eyes 20 are located. Through these eyes 20 draft-chains 21 are passed, the lower or inner ends of the chains being provided with pins 22 that may be arranged in any pair of the series of holes 19, whereby the length of the chains beyond the eyes 20 may be lengthened or shortened. To the outer end of one of the chains 21 an equalizer or evener 23 is secured and from the same in this instance extends a series of baling-straps 24. A similar strap 24, leads from the outer end of the remaining chain 21, or if desired this chain may support another evener, and a series of straps lead from the evener which arrangement I have shown in Fig. 4 of the drawings. The outer ends of the straps 24 are passed around a cross-bar or rod 25 and through keepers 26 which are arranged on the rod for the purpose of maintaining the straps at equidistant points from each other. L-shaped brackets 27, extend from the arms 6 and 8, and when the machine is in position to receive the trees, saplings or shrubs to be baled the said brackets form a convenient support for the cross-rod 25.

Pivoted to one of the sills 1 as shown at 28, is a swinging standard 29, and the same is provided near its upper end with a series of holes 30, in any one of which may be arranged a pin or eye-bolt 31 to the eye of which is connected a rope or light cable 32, which immediately above the eye passes through a guide kerf 33, formed in the upper end of the standard and beyond the same forms a loop, as will hereinafter appear around the end of the straw or other baling material, and has its free end connected to a small ordinary windlass 34, which is mounted upon the rear end of a connecting bar 35, which has its front end pivoted at 36 to an intermediate point upon the standard 29, and between its ends is pivoted at 37 to the cross-bar or beam 7. The windlass, as is shown, has a ratchet-wheel at one side and the usual holding-pawl for engaging the same. The operation of this device will hereinafter appear.

Upon the cross-piece 7 near one end there is arranged a pair of keepers, namely, an inner keeper 38, and an outer keeper 39, the outer keeper being considerably higher than the inner keeper and the two receiving a sliding rod 40, whose outer end is bent upward or vertically forming a branch or standard 41. To the center of this branch or standard is connected, in this instance, a transverse piece 42, though a series of said pieces may be connected if desired, and the pieces 41 and 42 are secured to the inner face of a cylindrical disk or ring 43. At the intersecting point of the pieces 41 and 42 may be located an inwardly disposed spur 44. By reason of the keeper 39 being larger than the keeper 38 it will be seen that the entire device may be raised and lowered, and at the same time is capable of being drawn out so as not to obstruct or interfere with the introduction of the baling material and trees or saplings to be baled.

In Fig. 1 the machine is shown in position for receiving trees or saplings, and in this figure, as is shown, the cradle is swung to nearly a vertical position which permits the swinging-leg to drop by gravity to a supporting position in which its lower end rests upon the ground. The cross-bar 25 is suspended in the brackets 27 at the lower side of the machine, whereby the baling straps are out of the way and the bar 40 is slid outward from the machine as before described. The straw, moss or other baling material is now arranged upon the supporting straps 10, after which the trees or saplings to be baled are introduced thereupon. After the bundle has been properly formed the baling straps have their free ends carried between the rear arms 6 and 8 over the bundle and between the front arms 6 and 8, the rod 25 being engaged with teeth upon the rack-bars 13 or 15. Such engagement of the rod 25 causes the swinging leg 11 to swing inward at its lower end so that it no longer affords a support for the cradle. The support being removed the cradle will swing to the front and is aided in such movement by the pull or weight of the operator which is now exerted thereupon, the operator grasping the cradle at any point most convenient. This downward movement of the cradle will cause the rack-bars 13 and 15 to slide by each other and the rod 25 to be carried by the rack bars 15 it engages; the rack-bar 13 serving to hold the rod down while the latter rack bar serves to pull the same. Such movement upon the part of the cradle, as will be obvious, causes the baling straps to be drawn closely about the bale, said straps drawing evenly from each side of each terminal for the reason that the terminals lead to a common point. It will be seen that the cradle is pivoted eccentrically with relation to the point of connection with the baling straps, hence the first portion of the movement of the cradle will cause the greatest binding action of the straps and, as will be obvious, requires the least amount of power to accomplish it and furthermore that as the cradle swings to its lowermost position the leverage upon the cradle is increased and the movement of the straps decreased. This enables the operator to give the finishing pull and pressure upon the bale under the most advantageous circumstances. Should the operator find that he has not sufficient tension upon the baling straps the cradle may be elevated either partly or wholly and at such elevation the rack-bars 13 will serve to hold the cross-bar 25 and prevent any material slackening of the baling straps. By relowering the cradle the teeth of the lower rack-bars 15 engaging with the cross-bar 25 will again draw upon the baling straps and tighten the same, as will be obvious. Previous to the applying of tension to the baling straps the ring 43 and its supports are slid inward so that the straw or other baling material will take around the periphery of the ring, the projecting ends of the parts 41 and 42 serving to divide the baling material and prevent it from being forced to any particular point around the bale. The cord or cable 32 is now looped about the baling material in rear of the ring 43 and the pin at the free end of the same introduced in any one of the pin holes 30 with which the standard 29 is provided. The ends of the cable being eccentrically connected with relation to each other it will be seen that the loop formed by the cable will gradually decrease in size and thus serve to punch or squeeze the ends of the baling material together immediately in rear of the ring whereby the ring serves to flare the ends. While in this position the baling cord or wire is applied and the flared ends of the material will prevent the same from slipping off after the bale is removed.

It will be noticed that the spur 44 with which the ring is provided in this instance but which I may omit if desired, takes into the end of the bundle or bale and always maintains the ring concentric with the center of the same. In order that such may be flared the sliding bar 40 is given sufficient play by the large staple 39 in which it is mounted. After the bale has been formed and the ends of the baling material cut off in the customary manner the cradle is re-elevated, which movement sufficiently loosens the baling straps to permit of a removal of the cross-bar 25 from its engagement with the rack-bars and the cable 32 from around the bale. The baling straps are then replaced at the rear side of the machine and the bale removed.

The foregoing is a description of my preferred form of machine and a detailed description of the operation of the same. It will be obvious that I may omit the double rack bars and provide just a single rack-bar in which instance the single rack bar would be pivoted at its lower end to the base of the machine in the same manner as is the rack-bar 15 and at its upper end be loosely connected by a clip to one of the front arms 6 or 8. Such a construction I have illustrated in Fig. 9 of the drawings.

In Figs. 4 and 5 of the drawings I have illustrated a modified construction of my invention wherein the machine is better adapted for baling upon large trees, and I will now proceed to describe in detail the construction of the same.

45 designates a transverse sill, which corresponds to the transverse sill 2 of the former construction, and from the same, as in the previous instance, the pairs of standards 46 extend, the ends of which are bolted to the sill 45 and from points near their centers are diverged to form the supporting arms 47 below which they are connected by the cross bar 48. At intervals diverging arms 49 arranged in pairs are bolted at 50, to the bar 48. Eyes 51 are located at the ends of the arms 47 and 49, and the supporting straps 52 have their ends connected to the eyes and are passed under rings or loops 53, which are located upon the arms 47 and 49 immediately below the eyes 51. A pair of hand-levers 54, have their lower ends pivoted or fulcrumed in bearings 55 located upon the sill 45 between the central and end standards 46. A series of perforations 56 is formed in each of the hand-levers 54 and below the perforations rings 57 are located. Through each of the rings 57 a draft chain 58, has its rear end passed, the upper end of the draft chain being provided with a pin 59 which may be engaged with any one of the openings 56. To the front end of each chain 58 an evener 60 is connected and to one of said eveners, at one end, a second evener 61, is connected from the ends of each of the eveners, and from the center of that evener not provided with the evener 61 extend baling straps 62, which straps project forward between the series of arms 47 and 49 and are connected by a transverse rod 63. The ends of the straps pass around the rod as shown and under keepers 64 with which the rod is provided as heretofore described.

Pivoted at 65 to each of the levers 54 is a rack-bar 66 the teeth of which are rearwardly inclined, and similarly pivoted at 67 to opposite rear arms 49 are rack-bars 68, whose teeth are inclined similarly to those of the bars 66 the said bars being designed to slide past each other as in the previous instance. Each bar is provided with an inwardly-disposed loop or keeper 69, and in the same rides the free end of a spring 70, which projects from the companion rack-bar.

In a keeper 71, located at the end of the sill 45, there is located a bar 72. The bar has its under side provided with a series of holes 73, any one of which may engage with a pin 74, rising from the sill under the keeper. The keeper is sufficiently large to permit of the bar freely sliding within the same and also to vibrate. Near the upper end of the bar there is secured to it a cross-bar or arm 75, and at the intersection of the two there may be arranged an inwardly disposed support or spike 76. The two bars have secured to them and concentric with the spike a disk or ring 77. At the upper end of the bar 72 a windlass 78 is located and to the same is secured the baling cord or cable 79 the opposite end of which is removably connected to the second windlass 80.

The operation of the modified construction is very similar to the one previously described, and in order that the same may be thoroughly understood, I will proceed to give a detailed description thereof.

In Fig. 4 the machine is illustrated as being in condition to receive the trees or saplings, but previous to the introduction of the same the bar 72 and parts carried thereby are swung away from the machine, which movement is permissible by reason of the keeper 71 being considerably larger than the bar. After the trees and the baling material have been introduced the cross-bar 63 is carried to the rear so that the baling straps 62 pass between the upper series of arms 47 and 49 of the cradle, and the said cross-bar is connected at a suitable point with the teeth of the rack bars. The operator now grasps either one or both of the levers 54 and thus operates them either simultaneously or singly so as to draw upon the rack bars 66. The rack bars 66 will carry with them the rod 63 thus drawing upon the baling straps in the same manner as heretofore described. By throwing the levers to the front the rod may be re-engaged by the bars 66 and a further pull be given so as to increase the tension of the baling straps. The operator so gages the work that when the final pull is given the handles are in their lowered positions, namely, upon the ground, and inasmuch as the points of connection of the chains 58 with the levers are then swung below the fulcrum points 55 of said levers the tension upon the baling straps will serve to lock the parts in position against any movement whatever. The bar 72 is now swung in toward the end of the bale and the operation of applying the bale cords or ties is similar to that heretofore described and need not be particularized.

As in the previous instance, it will be obvious that the single rack-bar may be employed in connection with this form of machine, though it is not so well adapted for such movement as it is in the machine previously described, for the reason that the machine last described is especially intended for baling large trees where great power is required, and the machine is necessarily longer than in the first instance and the slack cannot be taken up as readily by hand, but requires powerful levers.

Having described my invention, what I claim is—

1. In a machine of the class described, the combination with a base, a cradle comprising diverging arms mounted upon the base straps loosely connecting the upper ends thereof, baling-straps passed between the arms of the frames, and means for connecting the terminals of the straps at a common point eccentric with the point of connection between the cradle and base, and means for putting the straps under tension, substantially as specified.

2. In a machine of the class described, the combination with the base, the cradle comprising diverging arms, straps loosely connecting the upper ends thereof rack-bars connected at their upper ends to the front arms of the cradle and at their lower ends to the base, of baling-straps passed between the arms of the cradle and having their rear ends connected to the base adjacent to the lower ends of the rack-bars, and a cross-bar connected to the free ends of the baling-straps and adapted to engage the teeth of the rack-bars, substantially as specified.

3. In a machine of the class described, the combination with a base, a pivoted cradle mounted thereon, and a pivoted supporting-leg connected with the cradle, of a rack-bar connected at its upper end to the cradle and at its lower end to the base in rear of the point of pivot of the cradle, baling-straps passed between the arms composing the cradle and having their rear ends connected to the base, and a cross-bar connected on the front ends of the straps adapted to engage the rack bars and to support the supporting-leg at the supporting position, substantially as specified.

4. In a machine of the class described, the combination with the base, the cradle, opposite pairs of rack bars having inclined teeth adapted to slide by each other, connections between the rack-bars and the cradle and base, and spring-supports for maintaining the rack-bars in alignment with each other, of baling-straps passed between the arms of the cradle, connections between the rear ends of the straps and the base, and a cross-bar connecting the free ends of the straps and adapted to engage the rack-bars, substantially as specified.

5. In a machine of the class described, the combination with the base, the Y-shaped cradle pivoted upon the same and comprising front and rear diverging arms, straps loosely connecting said arms the opposite pairs of rack-bars, the lower bars being pivoted at their lower ends in rear of the point of pivot of the cradle, and the upper ones pivoted at their upper ends to the front ends of the cradle, loops extending from the corresponding edges of the bars, and spring-tongues extending from the bars and taking into the loops, of baling straps passed between the arms of the cradle, connections between the rear ends of the same and the base, and a cross bar connecting the front end of the straps and adapted to engage the rack-bars, substantially as specified.

6. In a machine of the class described, the combination with the base having a series of perforations and at opposite ends of the same eyes, of the Y-shaped pivoted cradle, chains passed through the eyes, pins at the inner ends of the chains for engaging the perforations, baling-straps connected with the chains, and means for locking the free ends of the baling-straps at the opposite sides of the cradle, substantially as specified.

7. In a machine of the class described, the combination with the base, the pivoted Y-shaped cradle, the baling-straps and means for securing the same, of a ring, radiating arms connected to the ring, means for loosely connecting one of the arms to the machine, a binding-cord and means for tightening said cord, substantially as specified.

8. In a machine of the class described, the combination with the base, a pivoted Y-shaped cradle mounted thereon, the baling-straps, and means for securing the ends of the same, of the bar 29, pivoted to the frame in front of the cradle, the bar 35, pivoted between its ends to the end of the cradle, and at its front end to the bar 29, the windlass on the rear end of the bar 35, and the baling cord connected to the windlass and to the bar 29, substantially as specified.

9. In a machine of the class described, the combination with the base, the pivoted Y-shaped cradle, the baling straps and means for securing the ends of the same of the bar 29 pivoted at its lower end to the base and having a series of perforations 30, the bar 35 pivoted between its ends to the end of the cradle and at its front end pivoted to the bar 29, the windlass on the rear end of the bar 35, the binding cord connected to the windlass and passed through a kerf in the bar 29, and the pin connected to the binding cord and movably inserted in one of the openings 30, substantially as specified.

10. In a machine of the class described, the combination with the base, the Y-shaped cradle, the intermediate cross-bar 7, connecting the arms thereof, the pair of staples mounted on the cross-bar 7, the baling-straps located between the arms of the cradle, and means for tightening and locking the straps, of the rod 40 mounted for reciprocation and vibration in the staples and having its outer end upwardly bent to form the vertical branch 41, a transverse branch 42, connected to the branch 41, and rings connected to the branches 41 and 42, and the spike 44, located at the intersection of these parts 41 and 42, substantially as specified.

11. In a machine of the class described, the combination with the base, the Y-shaped cradle pivoted thereon the baling-straps, and means for securing the ends of the same, of the cradle supporting-leg 11, pivoted to the cradle, substantially as specified.

12. In a machine of the class described, the combination with the base, the pivoted Y-shaped cradle, the baling-straps, a cross-bar connecting the front ends of the same, and means for securing the cross-bar adjustably to the front of the cradle, of the pivoted leg 11 arranged in rear of the cross-bar and adapted to be elevated thereby, substantially as specified.

In testimony that I claim the foregoing as my own I have hereto affixed my signature in the presence of two witnesses.

HENRY O. THOMAS.

Witnesses:
JNO. H. SIGGERS,
E. G. SIGGERS.